June 26, 1945.  A. LYSHOLM  2,379,015
HYDRAULIC TORQUE CONVERTER
Filed March 6, 1940   2 Sheets-Sheet 1
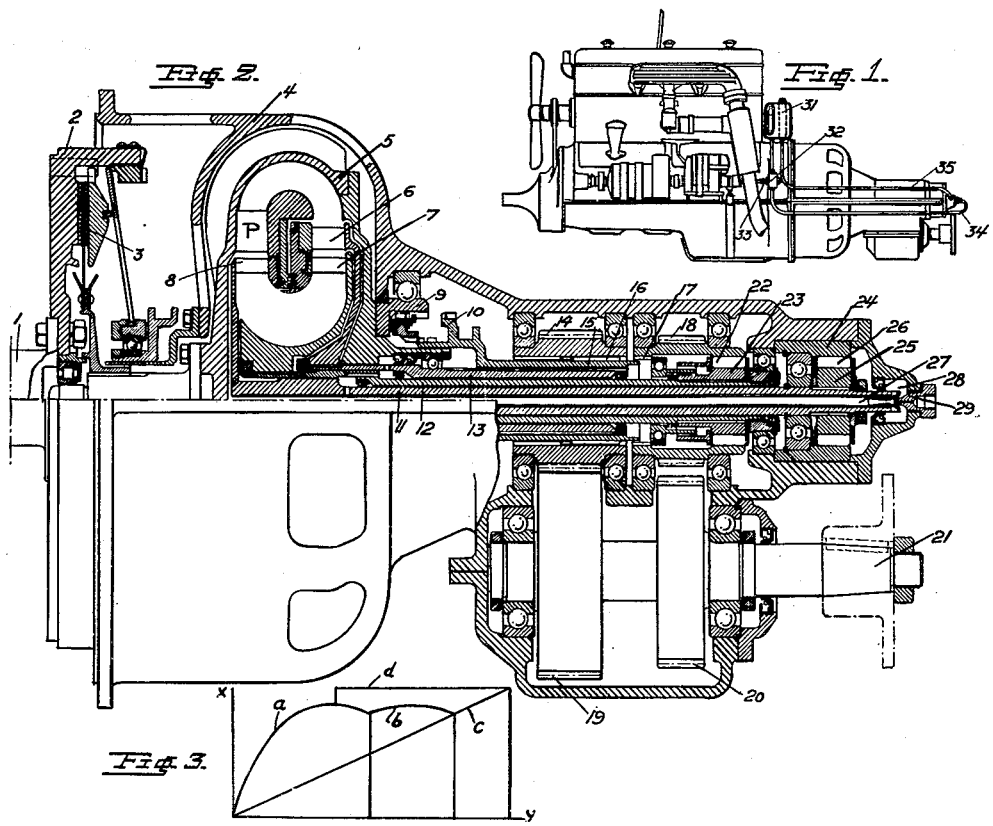

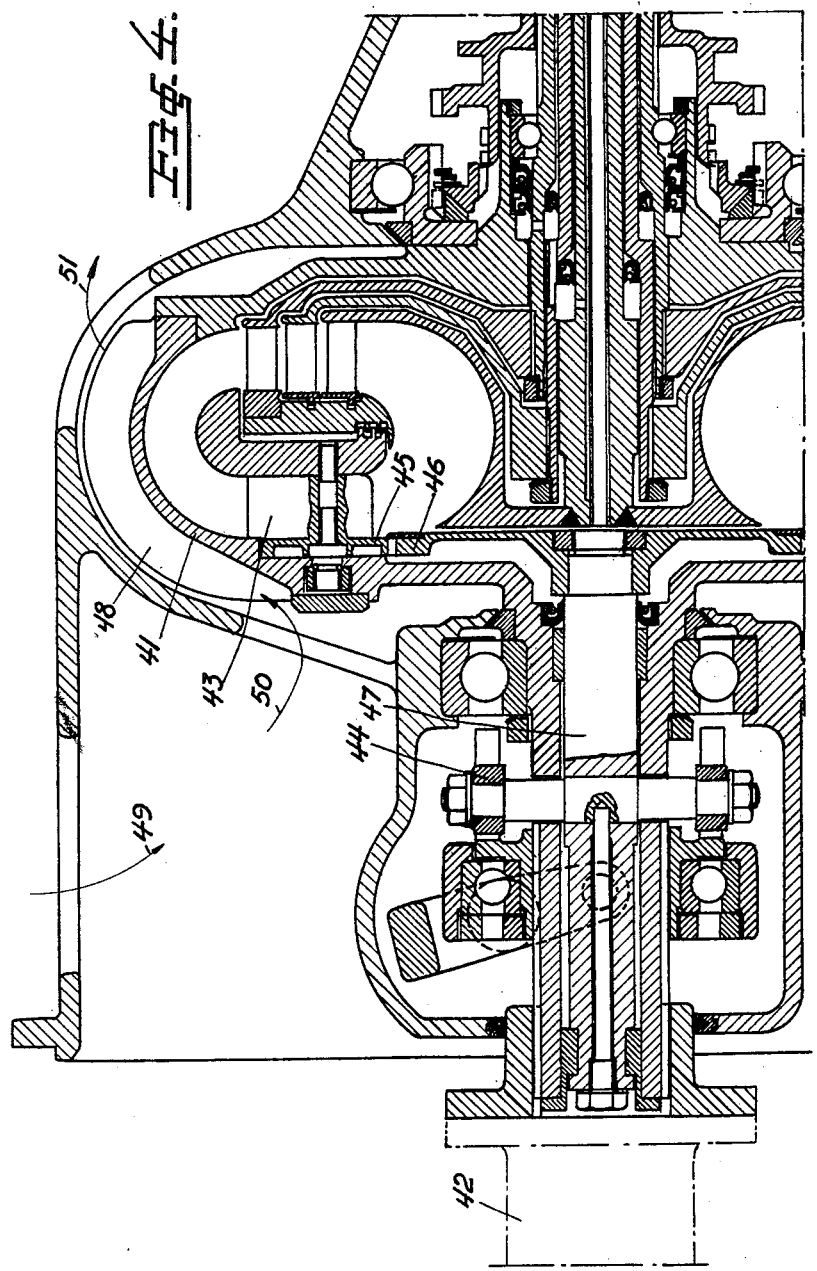

Patented June 26, 1945

2,379,015

UNITED STATES PATENT OFFICE 2,379,015

HYDRAULIC TORQUE CONVERTER

Alf Lysholm, Stockholm, Sweden, assignor, by mesne assignments, to Jarvis C. Marble, Leslie M. Merrill, and Percy H. Batten, trustees Application March 6, 1940, Serial No. 322,542
In Germany March 24, 1939

5 Claims. (Cl. 74—189.5)

Transmission gearing with a hydraulic torque converter is known in which at direct drive the motor shaft is directly connected with the driven shaft by means of a mechanical coupling, while the hydraulic part is disconnected by means of mechanical couplings.

It has further been proposed to use torque converters with a rotating housing, in which case the power transmission from the motor shaft to the driven shaft at direct drive is effected by means of the housing and the hydraulic elements by the use of free wheel couplings.

It is also known to use hydraulic torque converters with rotating housings, which are braked under certain conditions of operation. In the hydraulic power transmitting arrangement provided with a rotating housing, pump and turbine or turbine rows rotate in the same direction. However, with such a transmission the increase in torque at starting and at lower speeds of a vehicle by no means meets the requirements, but on the contrary is considerably lower than that obtained in torque converters with a fixed housing.

As the arrangement with rotating housings in torque converters offers certain advantages, the purpose of the invention is to so design the converter (the rotating housing of the converter) that the high increase in torque required is attained during the starting period. To this end the following steps are taken.

The pump of the torque converter is connected with the continuously rotating housing. The turbine of the torque converter consists of several moving blade rows, of which the blade row directly after the pump rotates in the same direction as the pump, the next blade row of the turbine rotating in the opposite direction. Thereby the moving blade row directly after the pump will be connected with the housing and the blade row rotating in opposite direction as well as the guide blade row will be disconnected by means of a free wheel coupling, so that these blade rows at direct drive will rotate freely in the same direction without causing any important losses. The housing of the torque converter will be connected with the motor shaft by means of a mechanical coupling.

At larger torque converters for very great motor outputs the housing of the torque converter can be rigidly connected to the motor shaft. In such case the pump of the torque converter will be provided with adjustable blades, which can be closed during starting of the motor or when changing the direction of drive of the vehicle, so that the pump will transmit no torque.

Embodiments of the invention are represented in the accompanying drawings, in which Fig. 1 shows the arrangement of the torque converter in a motor plant preferably in connection with a vehicle motor;

Fig. 2 represents a central axial section of the torque converter parallel to the shaft;

Fig. 3 is a diagram which shows the various efficiencies; and

Fig. 4 is a sectional view of a further embodiment of the invention.

In Fig. 2, 1 indicates the motor shaft, 2 the fly wheel of the motor, 3 is a coupling between motor and housing of the torque converter, 4 the fixed external housing of the torque converter, 5 the rotating inner housing of the torque converter, in which pump P is rigidly connected, 6 represents the blade row of the turbine rotating in the same direction as the pump, 7 is the turbine blade row rotating in opposite direction, and 8 is the guide blade row of the torque converter. 9 and 10 indicate the half parts of the mechanical coupling between the rotating inner housing 5 of the torque converter and the driven shaft for direct drive. 11 indicates the shaft carrying the guide blade row 8, 12 is the hollow shaft of the turbine moving blade row 7 rotating in opposite direction to the pump and 13 is the hollow shaft of the turbine blade row 6 rotating in the same direction as the pump. 14 indicates a gear wheel, which is connected to the shaft 15 by means of a key 16, and which meshes with gear wheel 19 of the driven shaft 21. 16 and 17 indicate a coupling, which is in mesh at reverse drive of the vehicle. 18 indicates a gear wheel, which is in mesh with gear wheel 20 of the driven shaft by means of an intermediate gear wheel. 22 indicates a free wheel coupling, which alternatively connects and disconnects part 23 connected to shaft 12 with and from gear wheel 18. 24 indicates a fixed part of the torque converter, forming the outer ring of another free wheel coupling 26, the inner ring 25 of which being rigidly connected to shaft 11. 27 is a pipe extending through the converter, in which the liquid is conveyed to the torque converter, and 28 indicates the outlet of this liquid. 29 is a nozzle, through which converter liquid at high pressure is introduced into pipe 27.

The transmission of liquid is effected by the liquid pump 32, driven by shaft 33 (shown in Fig. 1), which pumps the liquid under pressure through pipe 34 to nozzle 29. From the outlet 28 the liquid returns through pipe 35 to tank 31, which is conveniently provided with a filter.

Fig. 3 is a diagram, showing the variation of the efficiency in various cases:

(a) When the blade rows of the turbine rotate in opposite direction, (b) When only one turbine row of the torque converter is transmitting the torque of the pump, (c) When the torque converter is working as a hydraulic coupling, and finally (d) When direct drive of the motor shaft to the driven shaft is used.

As will be seen from the diagram, a very high traction force will be obtained at starting and at lower speeds, as well as a good efficiency at higher speeds, whereby the various modes of drive will adjust themselves automatically to the speed. The direct connection is conveniently effected manually, but can also be arranged automatically.

During hydraulic power transmission the coupling 9, 10 of Fig. 2, is not in mesh. On the other hand gear wheel 14 is in mesh with hollow shaft 13 by means of coupling 10. Further, the hydraulic free wheel coupling 22 with gear wheel 18 and part 23 as well as parts 24 and 25 are meshing by means of free wheel coupling 26.

At direct drive parts 9 and 10 as well as parts 14 and 15 are in mesh, but parts 16 and 17 as well as parts 18 and 23 and parts 24 and 25 are out of mesh.

At reverse drive parts 9 and 10 as well as 14 and 15 are out of mesh. However, parts 16 and 17 are in mesh, while parts 18 and 23 are out of mesh. Parts 24 and 25, however, are in mesh at reverse drive. At starting and at lower speeds the power transmission is effected both by the shaft, which carries the blade row 6 rotating in the same direction as the pump, as well as by the shaft carrying the turbine blade row 7 rotating in opposite direction to the pump. The guide blade row 8 is then rigidly coupled by means of free wheel coupling 26.

At higher speeds the free wheel coupling 22 disengages and the power transmission is effected by the turbine row 6. The guide blade row 8 is still rigidly coupled by means of free wheel coupling 26.

At very high speeds the free wheel coupling is also released whereupon the torque converter will operate as a hydraulic coupling. The direct coupling between the rotating housing and the driven shaft can be done at arbitrary speeds of the vehicle.

Fig. 4 shows a modification of the torque converter according to Fig. 2, whereby the rotating housing 41 of the torque converter is rigidly connected with motor shaft 42. However, the pump blades 43 of the torque converter are in this case adjustable by means of the adjusting arrangement 44. They are connected with gear wheels 45, which are in mesh with gear wheel 46. This gear wheel 46 is fixed to shaft 47. By the adjusting arrangement 44 shaft 47 is turned, the pump blades 43 being either closed or opened. The rotating housing 41 is provided with fins 48 serving as cooling fins. The cooling air is passed to the cooling fins 48 through holes 49 and 50. The hot air is drawn off through the openings 51 of the fixed housing.

In Fig. 2 the same cooling arrangement is shown.

It is to be understood that the invention embraces all forms of construction falling within the scope of the appended claims.

What I claim is:

1. A hydraulic torque converter including a rotatable casing having pump means fixed to rotate therewith, a first turbine wheel constructed to transmit power in the same direction of rotation as that of said casing, a second turbine wheel constructed to transmit power in a direction of rotation opposite that of said casing, concentric shaft members located one within the other for carrying said turbine wheels respectively, a driven member, gearing for connecting the shaft member carrying the first of said turbine wheels to said driven member, gearing for connecting the shaft member carrying said second of said turbine wheels to said driven member, said gearings being constructed respectively to transmit the opposite rotations of said turbine wheels in the same direction of rotation to said driven member, and a control member for selectively coupling the shaft member carrying said first turbine wheel to one or the other of said gearings, whereby to provide for forward or reverse drive of said driven member.

2. A hydraulic torque converter including a driving member, a rotatable casing having pump means mounted to rotate therewith, a first turbine wheel constructed to transmit power in the same direction of rotation as said casing, a second turbine wheel constructed to transmit power in a direction of rotation opposite that of the casing, a driven member, gearing for transmitting power from said first turbine wheel to said driven member, gearing for transmitting power from said second turbine wheel to said driven member, said gearings being constructed to transmit power from the oppositely rotating turbine wheels to said driven member in the same direction, means for selectively coupling said first turbine wheel to one or the other of said gearings whereby to secure either forward or reverse drive to said driven member, and a releasable clutch interposed between said driving member and said rotating casing to permit said selective coupling means to be shifted to secure the desired direction of drive of the driven member.

3. A hydraulic torque converter including a rotatable casing, pump blades mounted to rotate with said casing, a first turbine wheel constructed to transmit power in the same direction of rotation as that of the casing, a second turbine wheel constructed to transmit power in a direction of rotation opposite that of the casing, a driven member, gearing for connecting said first turbine wheel with said driven member, gearing for connecting said second turbine wheel with said driven member, said gearings being constructed to transmit power from the oppositely rotating turbine wheels in the same direction to said driven member, means for selectively coupling said first turbine wheel to one or the other of said gearings whereby to secure either forward or reverse drive of said driven member, and means for adjusting said pump blades relative to said casing to arrest the flow of working fluid to said turbine wheels, whereby to permit said selective coupling means to be shifted into engagement with the desired gearing.

4. A hydraulic torque converter including a rotatable housing having pump means fixed to rotate therewith, turbine means comprising a first wheel constructed to be rotated in the same direction as said housing by liquid circulated by said pump means and a second wheel constructed to be rotated in the direction opposite that of said housing by said liquid, a driven member, means for transmitting power from said turbine wheels to said driven member including an automatic one-way clutch between said second wheel and the driven member, said clutch being constructed to permit said second wheel to rotate freely in the same direction as said housing, and means including a releasable coupling providing a mechanical connection for transmitting power from said housing to said driven member.

5. A hydraulic torque converter including a rotatable housing having pump means fixed to rotate therewith, turbine means comprising a first wheel constructed to be rotated in the same direction as said housing by liquid circulated by said pump means and a second wheel constructed to be rotated in the direction opposite that of said housing by said liquid, guide blade means, an automatically operating one-way clutch for holding said guide blade means rotationally stationary against rotation in a direction opposite that of the housing and for permitting said guide blade means to rotate in the same direction as that of the housing, a driven member, means for transmitting power from said turbine wheels to said driven member including an automatic one-way clutch between said second wheel and the driven member, said clutch being constructed to permit said second wheel to rotate freely in the same direction as said housing, and means including a releasable coupling providing a mechanical connection for transmitting power from said housing to said driven member.

ALF LYSHOLM.